US007661194B1

(12) United States Patent
Ende

(10) Patent No.: US 7,661,194 B1
(45) Date of Patent: Feb. 16, 2010

(54) ROLLING PLATE ASSEMBLY ATTACHMENT FOR PORTABLE POWER CUTTING TOOLS

(75) Inventor: Mathias Am Ende, Mar Vista, CA (US)

(73) Assignee: K & E Enterprises, Inc., Marina del Rey, CA (US)

( * ) Notice: Subject to any disclaimer, the term of this patent is extended or adjusted under 35 U.S.C. 154(b) by 387 days.

(21) Appl. No.: 11/413,994

(22) Filed: Apr. 28, 2006

(51) Int. Cl.
*B27B 9/02* (2006.01)
*B27B 9/04* (2006.01)
*B23D 59/00* (2006.01)
*B26D 3/02* (2006.01)
*B26D 7/01* (2006.01)
*B26D 5/08* (2006.01)

(52) U.S. Cl. .............................. 30/376; 30/371; 30/373; 30/390; 83/523; 83/581; 83/761; 83/762; 83/820

(58) Field of Classification Search .................. 83/820, 83/487, 761, 762, 765, 565, 758, 574, 746, 83/581, 471.1, 522, 471.2, 471.3; 30/392, 30/394, 371, 390, 391, 374, 373, 375, 505, 30/376
See application file for complete search history.

(56) References Cited

U.S. PATENT DOCUMENTS 2,803,271 A * 8/1957 Shaw ........................ 83/468.3
4,181,057 A * 1/1980 Bassett ........................ 83/486.1
4,355,557 A * 10/1982 Mecsey ........................ 83/565
4,891,858 A * 1/1990 Wachter ........................ 15/82
4,909,111 A * 3/1990 Noble ........................ 83/397
4,957,024 A * 9/1990 Albrecht ........................ 83/471.3
5,090,283 A * 2/1992 Noble ........................ 83/467.1
6,202,311 B1 * 3/2001 Nickels, Jr. ........................ 30/376
6,568,088 B1 * 5/2003 Ende ........................ 30/371
7,159,323 B2 * 1/2007 Petrenko ........................ 30/373
7,373,865 B2 * 5/2008 Allen et al. ........................ 83/454
2007/0074404 A1 * 4/2007 Zhang ........................ 30/376

* cited by examiner

*Primary Examiner*—Ghassem Alie
(74) *Attorney, Agent, or Firm*—Thomas I. Rozsa

(57) ABSTRACT

The present invention is an attachable rolling plate assembly which can be attached as a single unit to a portable cutting tool to facilitate the safe rolling movement of the portable cutting tool on the workpiece. The invention comprises a front wheel housing portion, a back wheel housing portion, and two or three metal rods which interconnect the two housings. The housings removably retain a pair of spaced apart wheels and means to retain a cutting tool on the housings so that the cutting tool can be rolled on the workpiece during operation of the tool while the cutting blade portion of the tool extends between a pair of adjacent interconnecting rod members. The front and rear wheel housing assembly receives the cutting blade in between its pins or axles, so that the entire width of the saw plate is supported by the wheels during cutting.

10 Claims, 12 Drawing Sheets

ROLLING PLATE ASSEMBLY ATTACHMENT FOR PORTABLE POWER CUTTING TOOLS

BACKGROUND OF THE INVENTION

1. Field of the Invention

The present invention relates to the field of portable power cutting tools and to an apparatus which facilitates the ease and safety of handling the portable power cutting tool during the operation of the tool.

2. Description of the Prior Art

Portable power circular saws are widely used. Most conventional circular saws come with a flat plate attached to the bottom of the circular saw. When the circular saw is in use to cut a workpiece, the bottom plate of the circular saw comes in contact with the workpiece and slides on the workpiece as the circular saw is moving forward along the cutting direction.

The problem with the conventional flat plate device is that during the cutting operation, extra effort is required from the user of the circular saw to overcome the friction between the bottom plate attached to the circular saw and the work-piece. In addition, the standard attachment plates are heavy and have a tendency to slide in a side-to-side motion which often reduces the accuracy of the cut.

In addition, rotatory power cutting tools such as a rotary power saw can create a dangerous situation called kick-back. The heavy weight of the saw causes the saw blade to move out of the linear motion due to an unstable frictional binding of the flat attachment plate against the workpiece. As a result of this veering of the blade off a straight line motion, the blade may bind with the workpiece and subsequently kick back against the worker, thereby possibly causing serious injury to the worker.

The problem has been address by the present inventor in his Pat. No. 6,568,088 issued on May 27, 2003 for "Wheel Attachment For Portable Power Cutting Tools". While that was a fine invention, it has now been learned by the present inventor that the invention as embodied in the previous patent has several drawbacks. First, the wheel attachment devices must be individually placed on the saw bracket which is time consuming and results in extra effort. In addition, the wheels are not replaceable and if one wheel is broken or is worn, it may affect the operation of the rotary power saw.

Therefore, there is a significant need for an improved device to assist in the safe operation of a rotary cutting tool and which overcomes the deficiencies in the present inventor's previous invention.

SUMMARY OF THE PRESENT INVENTION

The present invention is an attachable rolling plate assembly which can be attached as a single unit to a portable cutting tool to facilitate the safe rolling movement of the portable cutting tool on the workpiece. The invention comprises a front wheel housing portion, a back wheel housing portion, and three metal rods which interconnect the two housings. The housings removably retain a pair of spaced apart wheels and means to retain a cutting tool on the housings so that the cutting tool can be rolled on the workpiece during operation of the tool while the cutting blade portion of the tool extends between a pair of adjacent interconnecting rod members.

It has been discovered, according to the present invention, that is an attachment member used with a rotary power cutting tool is comprised of a structure which has substantial gaps within the body of the structure, then the weight of the attachment member is significantly reduced to facilitate ease of operation during the cutting process.

It has further been discovered, according to the present invention, that if the attachment member used with a rotary power cutting tool is comprised of interconnectable parts which has a pair of oppositely disposed housing members which retains rollable wheels thereon and are interconnected by removably attached connecting rods, then in the event a housing member or rod is damaged, the attachment member can be easily disassembled and the broken or damaged part easily replaced without having to discard the entire attachment member.

It has additionally been discovered, according to the present invention, that if the attachment member is comprised of a body having oppositely disposed housing members each of which retain at least one rollable wheel (which could be spread between two arms with the middle arm eliminated) and preferably a pair of aligned rollable wheels, then a portable power cutting tool can be retained on the attachment member which becomes a rolling plate assembly which facilitates a rolling motion of the power tool as it is used to operate on a workpiece. For example the power tool is a rotary power cutting saw, then the rollable wheels facilitate a smooth rolling motion on the workpiece as the cutting operation is performed.

It has also been discovered, according to the present invention, that if the rollable wheels on the rolling plate assembly are made of material such as polyurethane or rubber which creates a traction on a workpiece as the part is rolling during a cutting operation, then the traction of the wheels prevent a side to side lateral movement of the power cutting tool such as rotary cutting saw to thereby reduce the possibility that the cutting blade will be caused to move out of alignment and thereby bind to the workpiece during cutting, thereby significantly reducing the possibility of a kick-back of the cutting rotary saw against the worker operating the power tool.

It has further been discovered, according to the present invention, that if wheels are removably retained within each housing member, then if one or more wheels becomes damaged or is badly worn, the damaged or worn wheel can be easily replaced and it is not necessary to discard the entire rolling plate assembly.

It has also been discovered, according to the present invention, that if the wheels of the rolling plate assembly have a diameter which raises the body of the rolling plate assembly above the workpiece, the ease of rolling is facilitated. In addition, the wheels help to absorb vibration from the power tool.

It has further been discovered, according to the present invention, that if the rolling plate assembly has means to quickly attach a power tool such as a rotary cutting saw to the assembly, then the assembly can be quickly attached thereby saving time and effort during the cutting process. One housing member can retain an attachment means which is attached to the front of a rotary power saw by a pair of mating arms through which an attaching bolt is connected. The member can have an arcuate tilt bracket with the connecting arms attached by a rotatable rivet so that th angle of tilt of the rotary power saw relative to the rolling plate assembly can be adjusted to a desired angle of tilt. If the oppositely disposed housing member supports an attachment means which includes an elevation bracket with an arcuate opening and which is rotatably supported so that it can be rotated in a vertical direction, the angle of arc of the cutting blade of a rotary power saw and the depth of the blade relative to the bottom of the rolling plate assembly can be vertically adjusted to achieve any desired depth of cut. If this assembly is also rotatably attached to the second housing member, then the angle of tilt of the back of the rotary power saw can also be adjusted to any desired angle of tilt.

It is therefore an object of the present invention to provide an attachment member used with a rotary power cutting tool which is comprised of a structure which has substantial gaps within the body of the structure, so that the weight of the attachment member is significantly reduced to facilitate ease of operation during the cutting process. The frame is configured of rods which are round profile stock material. This is used for better strength-weight ratio.

It has further object of the present invention to provide an attachment member used with a rotary power cutting tool which is comprised of interconnectable parts which has a pair of oppositely disposed housing members which retains rollable wheels thereon and are interconnected by removably attached connecting rods, so that in the event a housing member or rod is damaged, the attachment member can be easily disassembled and the broken or damaged part easily replaced without having to discard the entire attachment member.

It is an addition object of the present invention to provide an attachment member which is comprised of a body having oppositely disposed housing members each of which retain at least one rollable wheel and preferably a pair of aligned rollable wheels, so that a portable power cutting tool can be retained on the attachment member which becomes a rolling plate assembly which facilitates a rolling motion of the power tool as it is used to operate on a workpiece. For example if the power tool is a rotary power cutting saw, then the rollable wheels facilitate a smooth rolling motion on the workpiece as the cutting operation is performed.

It has also been discovered, according to the present invention, that if the rollable wheels on the rolling plate assembly are made of material such as rubber or polyurethane which creates a traction on a workpiece as the part is rolling during a cutting operation, then the traction of the wheels prevent a side to side lateral movement of the power cutting tool such as rotary cutting saw to thereby reduce the possibility that the cutting blade will be caused to move out of alignment and thereby bind to the workpiece during cutting, thereby significantly reducing the possibility of a kick-back of the cutting rotary saw against the worker operating the power tool.

It is a further object of the present invention to provide a rolling plate assembly where the wheels are removably retained within each housing member, so that if one or more wheels becomes damaged or is badly worn, the damaged or worn wheel can be easily replaced and it is not necessary to discard the entire rolling plate assembly.

It is a further object of the present invention to provide a rolling plate assembly where wheels of the rolling plate assembly has a diameter which raises the body of the rolling plate assembly above the workpiece, so that the ease of rolling is facilitated. In addition, the wheels help to absorb vibration from the power tool.

It is a further object of the present invention to provide a rolling plate assembly which has means to quickly attach a power tool such as a rotary cutting saw to the assembly, so that the assembly can be quickly attached thereby saving time and effort during the cutting process. One housing member can retain an attachment means which is attached to the front of a rotary power saw by a pair of mating arms through which an attaching bolt is connected. The member can have an arcuate tilt bracket with the connecting arms attached by a rotatable rivet so that th angle of tilt of the rotary power saw relative to the rolling plate assembly can be adjusted to a desired angle of tilt. If the oppositely disposed housing member supports an attachment means which includes an elevation bracket with an arcuate opening and which is rotatably supported so that it can be rotated in a vertical direction, the angle of arc of the cutting blade of a rotary power saw and the depth of the blade relative to the bottom of the rolling plate assembly can be vertically adjusted to achieve any desired depth of cut. If this assembly is also rotatably attached to the second housing member, then the angle of tilt of the back of the rotary power saw can also be adjusted to any desired angle of tilt.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
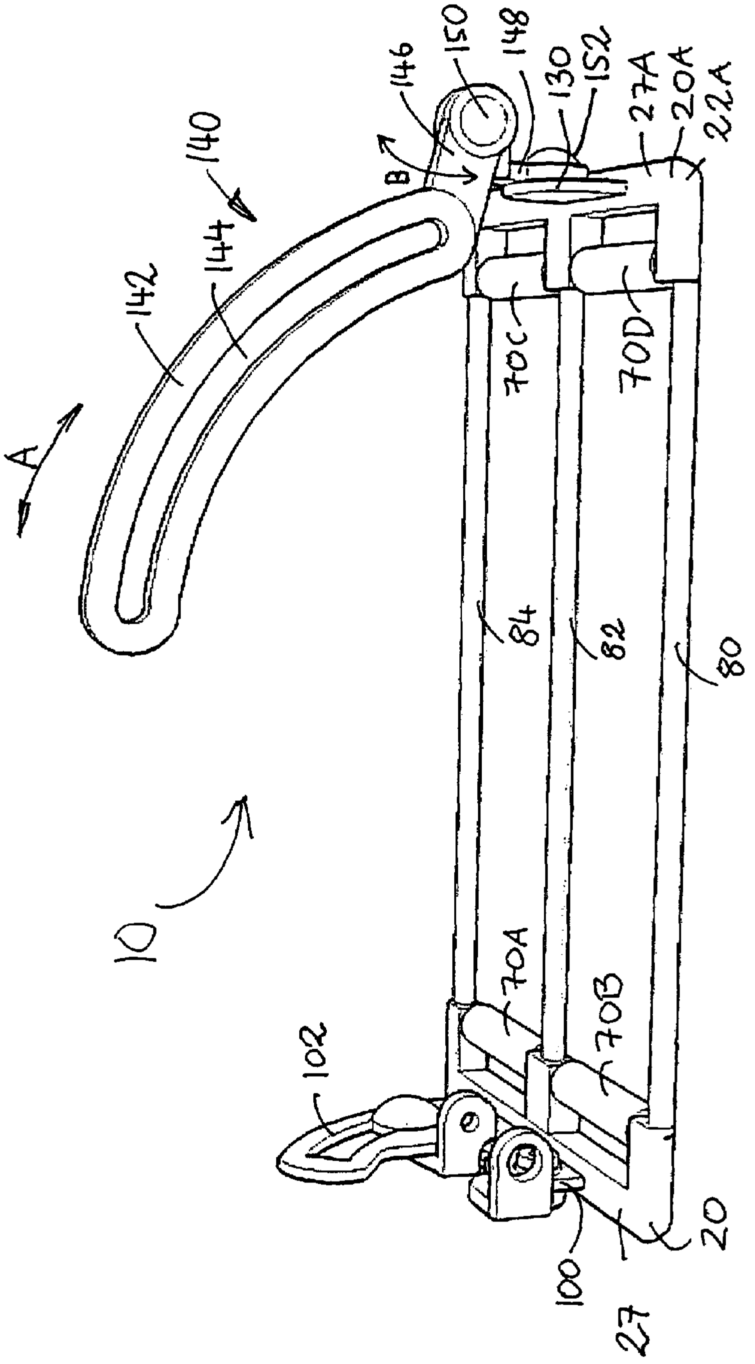
FIG. 1 is a perspective view of the fully assembled rolling plate assembly of the present invention.
Figure 2:
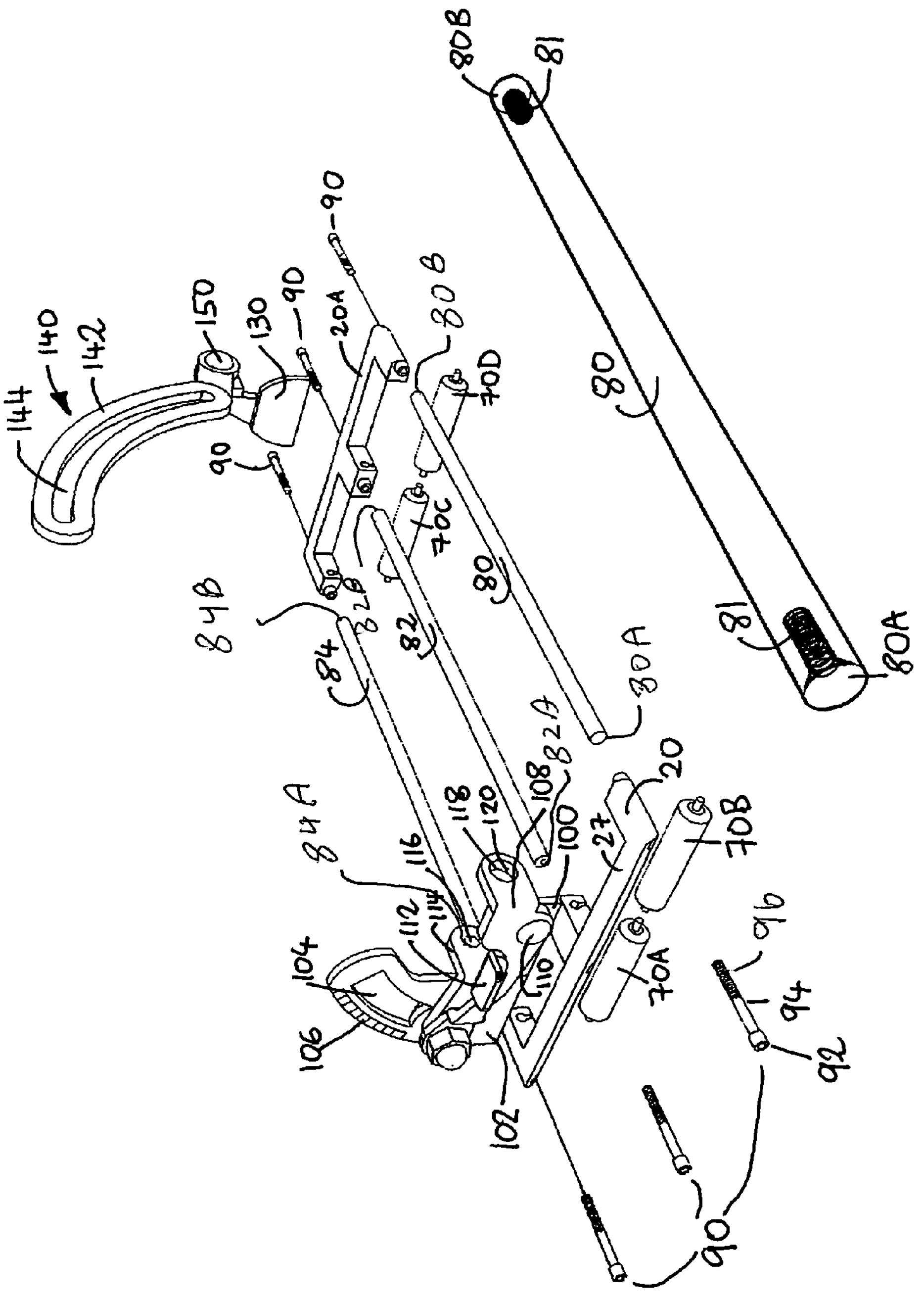
FIG. 2 is an exploded view illustrating all of the components of the present invention rolling plate assembly.

Referring to FIG. 1, there is illustrated a perspective view of the fully assembled rolling plate assembly 10 and FIG. 2 is an exploded view to better illustrate the component parts and how they are assembled together. The rolling plate assembly 10 assembly comprises a first housing member 20 and a second housing member 20A which is a mirror image of the first housing member 20. As will be discussed in detail below, the first housing member removably retains a pair of spaced apart rolling wheels 70A and 70B and similarly, second housing member 20A also removably retains a pair of spaced apart rolling wheels 70C and 70D. As illustrated in FIG. 1, wheels 70A and 70C are parallel and wheels 70B and 70D are parallel. The pair of housing members 20 and 20A are retained together by three rods, a first rod 80, a middle or second rod 82, and a third rod 84. As will be explained below, the three rods are respectively removable from each housing member so that a housing member or one or more rods can be replaced. As will be discussed below, the first housing member 20 supports means to retain a portion of a power tool such as a rotary power saw and the second housing member 20A also contains means to retain another portion of the power tool such as a rotary power saw.

Figure 3:
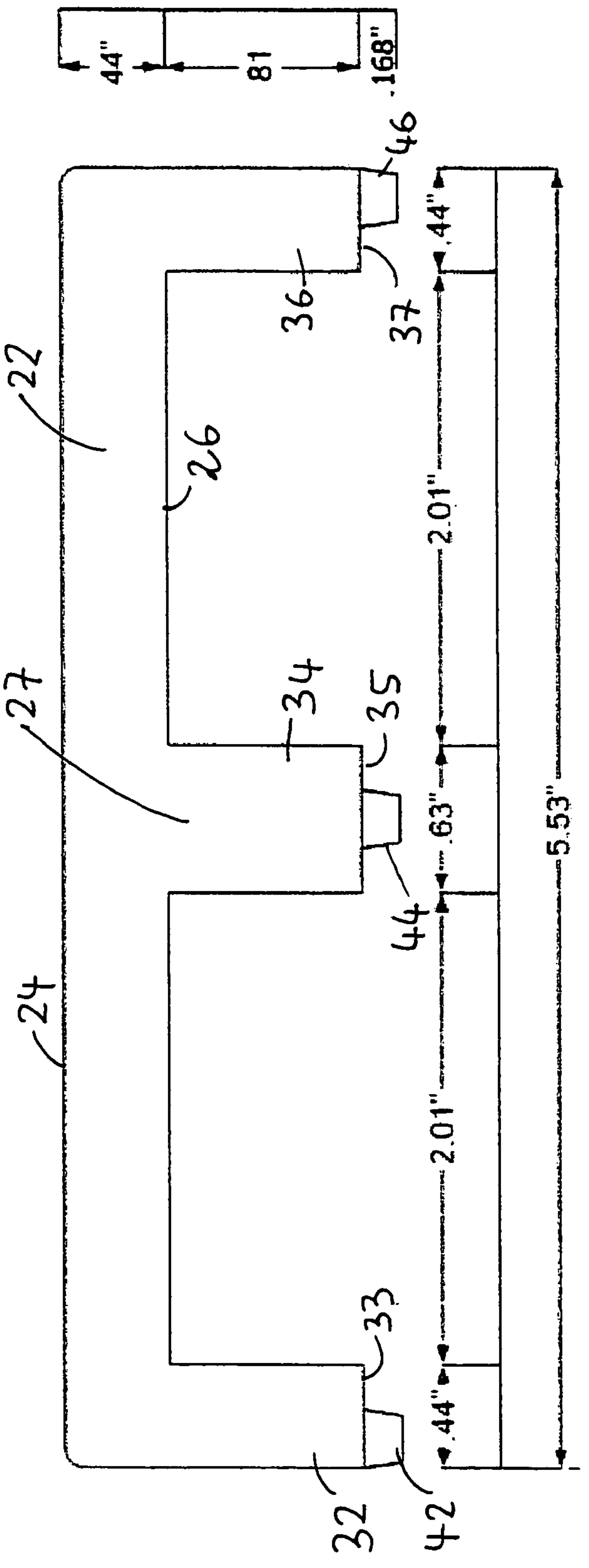
FIG. 3 is a top plan view of one of the two housing members of the present invention.
Figure 4:
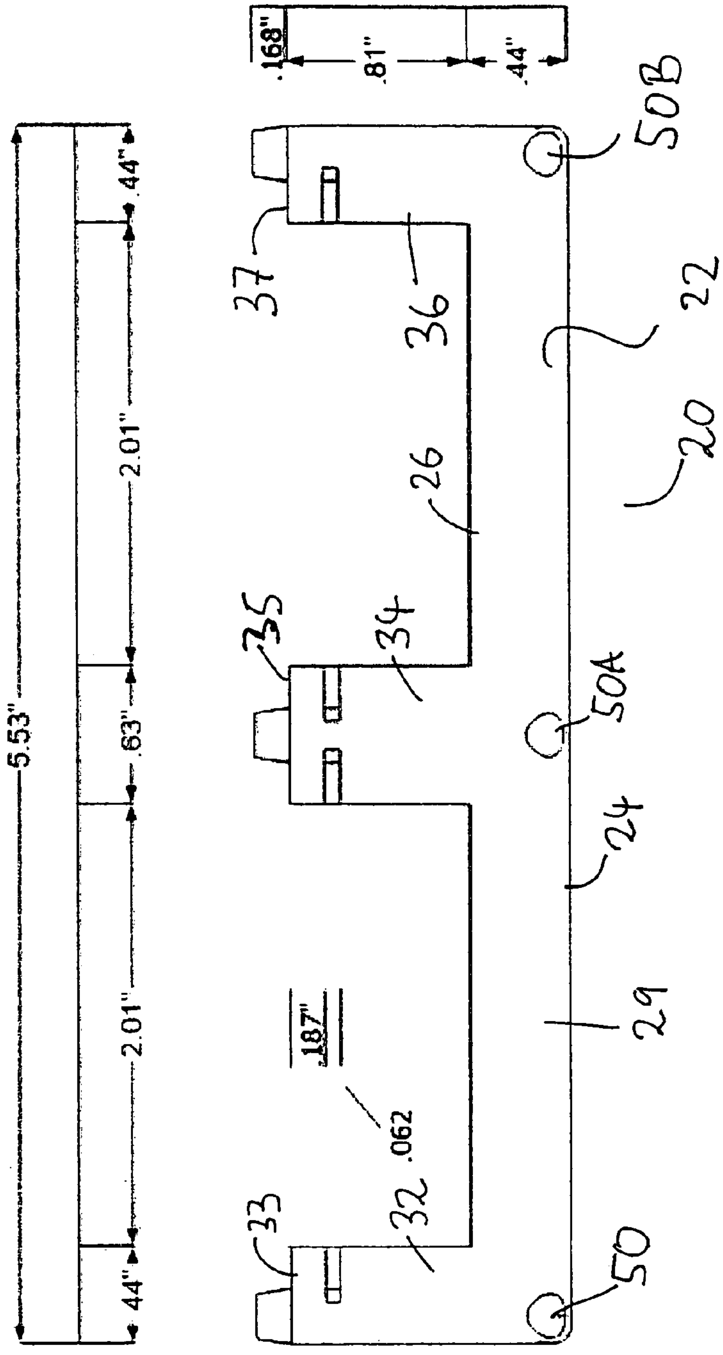
FIG. 4 is a bottom plan view of one of the two housing members of the present invention.
Figure 5:
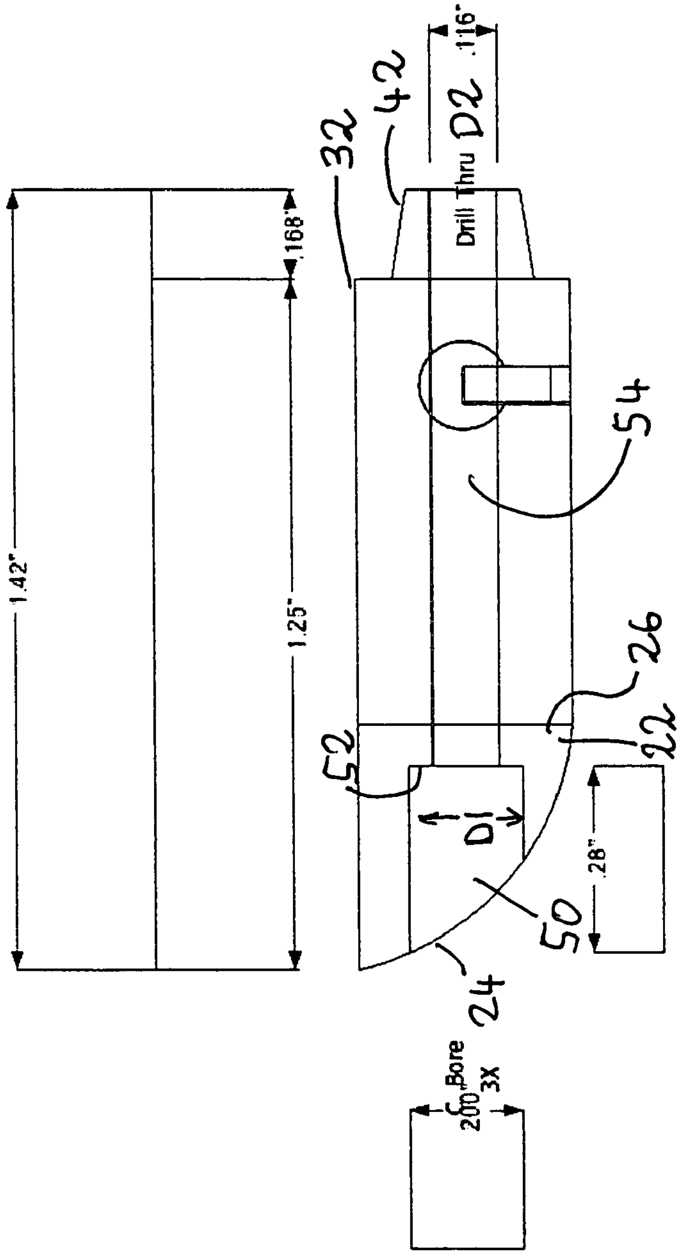
FIG. 5 is a side view of one of the two housing portions of the present invention, drawn in partial cross-section with dashed lines to illustrate interior bores within the housing and a protrusion or chuck member that extends from the housing, and also showing the curvature of one end of the housing.
Figure 6:
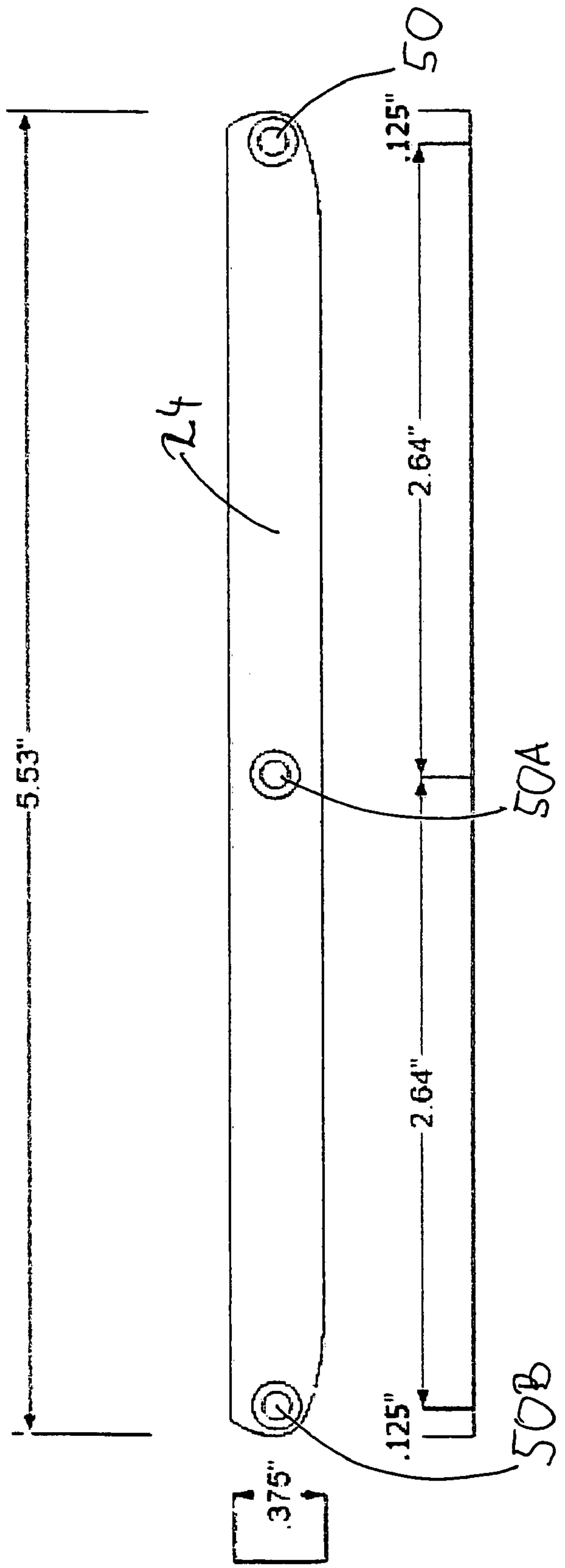
FIG. 6 is a front elevational view of one of the two housing members of the present invention, illustrating three spaced apart counterbores.
Figure 7:
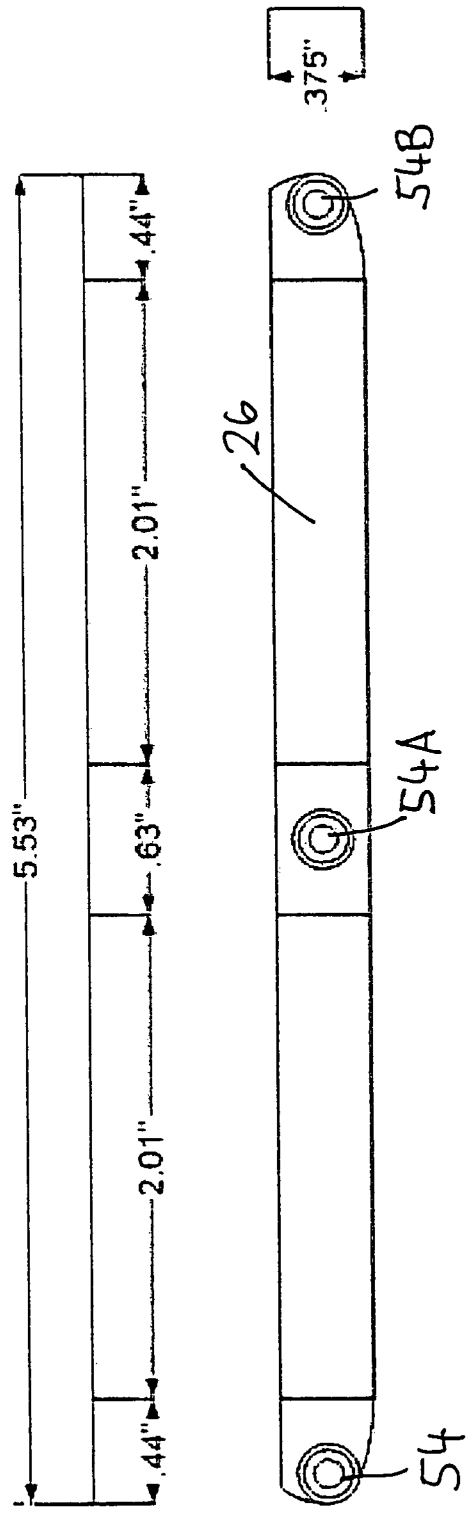
FIG. 7 is a rear elevational view of one of the two housing members of the present invention, illustrating three spaced apart chuck members.
Figure 8:
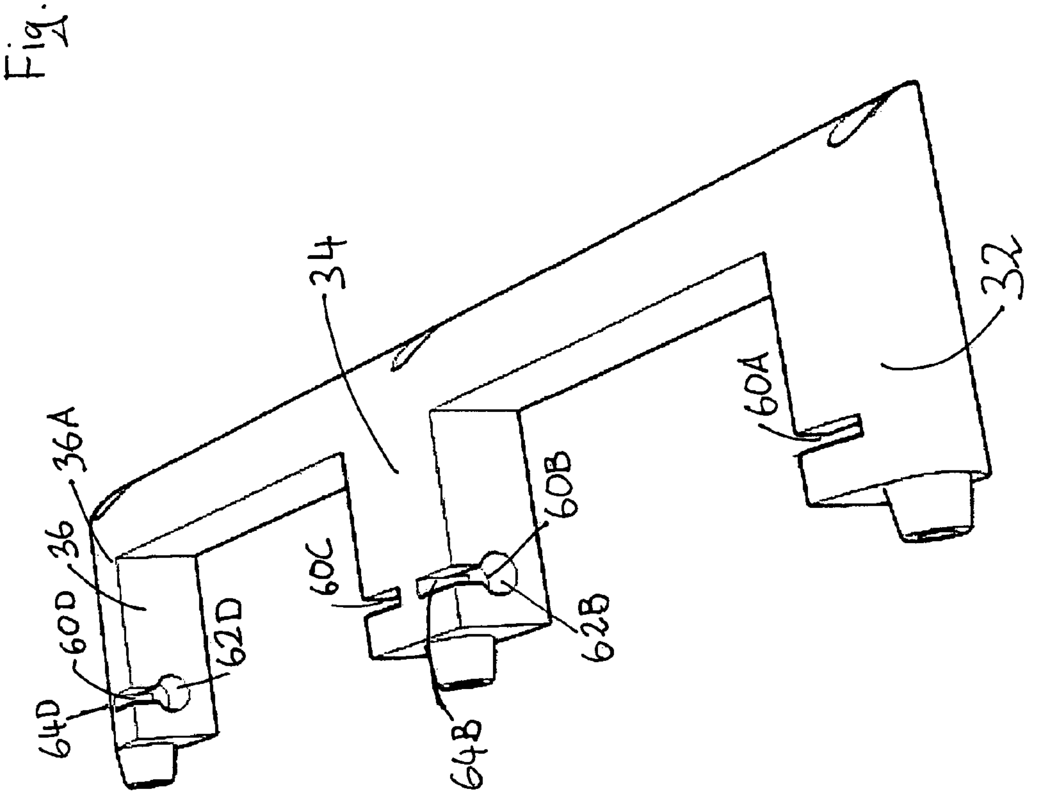
FIG. 8 is a bottom perspective view of one of the two housing portions of the present invention.
Figure 9:
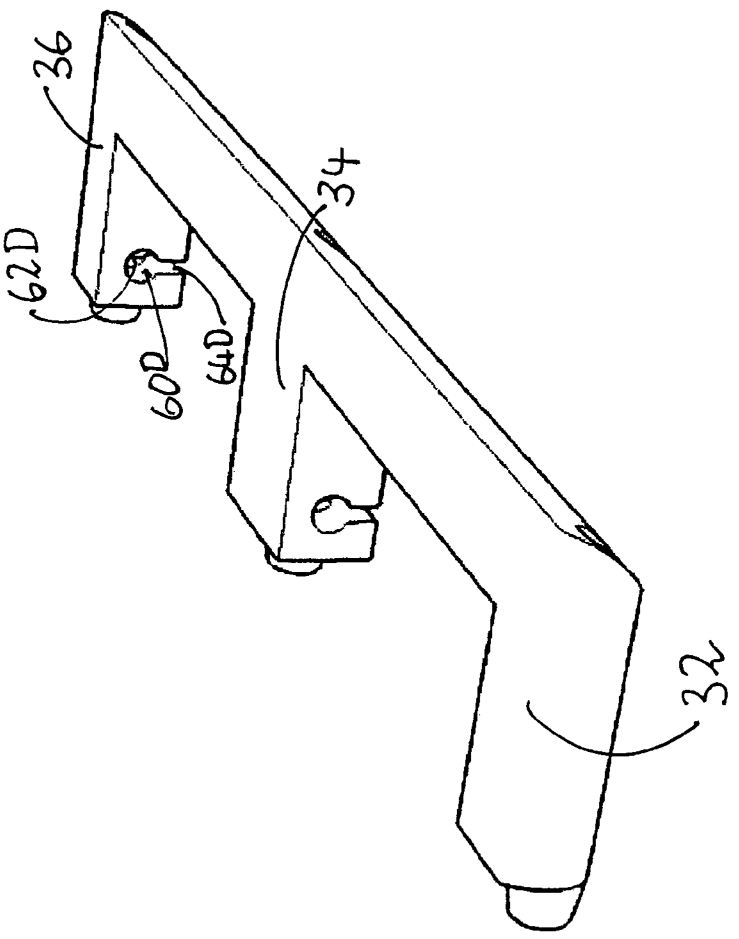
FIG. 9 is top perspective view of one of the two housing members of the present invention.

Each of the components will now be discussed in detail. Referring to FIGS. 3 through 9, there is illustrated views of the a housing member of the present invention which can be either the first or the second housing member. The part will be described in detail for the first housing member 20, with the understanding that the components of the second housing member 20A are the same but are a mirror image of the first housing member 20. Referring to FIGS. 3 and 4, the housing member 20 has a main body 22 having a leading or front edge 24 and a rear edge 26. As illustrated in FIG. 5, the front edge 24 is arcuate in order to enable the assembly to more easily roll over a surface. The main body 22 has three spaced apart parallel transverse arms 32, 34 and 36 which extend transversely from the rear edge 26. The distal end of each arm respectively has a chuck member 42, 44, and 46 which extends away from each respective distal end 33, 35 and 37. Referring to the side view of the housing illustrated in partial cross-section in FIG. 5, the front edge 24 has a large counter interior bore which extends into the main body 22 but does not extend to the rear edge 26. By way of example, the diameter D1 of the interior counterbore 50 can be approximately 0.200 inch. The interior counterbore 50 has a transverse interior face 52. A smaller diameter interior bore 54 extends from the transverse face 52 through the transverse arm 32 and through the chuck member 42 as illustrated in FIG. 5. By way of example only, the diameter D2 of the smaller diameter interior bore 54 can be approximately 0.116 inch. As illustrated in the front elevational view of FIG. 6, there are three such interior counterbores 50, 50A and 50B respectively aligned with a respectively transverse arm 32, 34, and 36. Similarly, as illustrated in the rear elevational view of FIG. 7, there are three smaller diameter interior bores 54, 54A and 54B extending through each respective transverse arm 32, 34 and 36 and extending out of each respective chuck member 42, 44 and 46. Referring to the bottom perspective view of FIG. 8 and the top perspective view of FIG. 9, the first and third transverse arms 32 and 36 have one interior chamber which opens toward middle or center transverse arm 34 and center or transverse arm 34 has two spaced apart interior chambers, one opening toward transverse arm 32 and one opening toward transverse arm 36. For transverse arm 36, there is an interior chamber 60D which is comprised of a generally circular portion 62D which is a pin receiving chamber which extends partially transversely through transverse arm 36 and a slotted opening 64D which extend from the bottom 36A of transverse arm 36 and interconnects with pin receiving chamber 62D. It will be appreciated that transverse arm 32 has a similar interior chamber 60A which is a mirror image to interior chamber 60D. Middle transverse arm 34 has a pair of spaced apart interior chambers 60B and 60C, with interior chamber 60B has a pin receiving chamber 62B and a slotted opening 64B and interior chamber 60C has the same components. Interior chamber 60A is aligned with interior chamber 60B and interior chamber 60C is aligned with interior chamber 60D.

Figure 10:
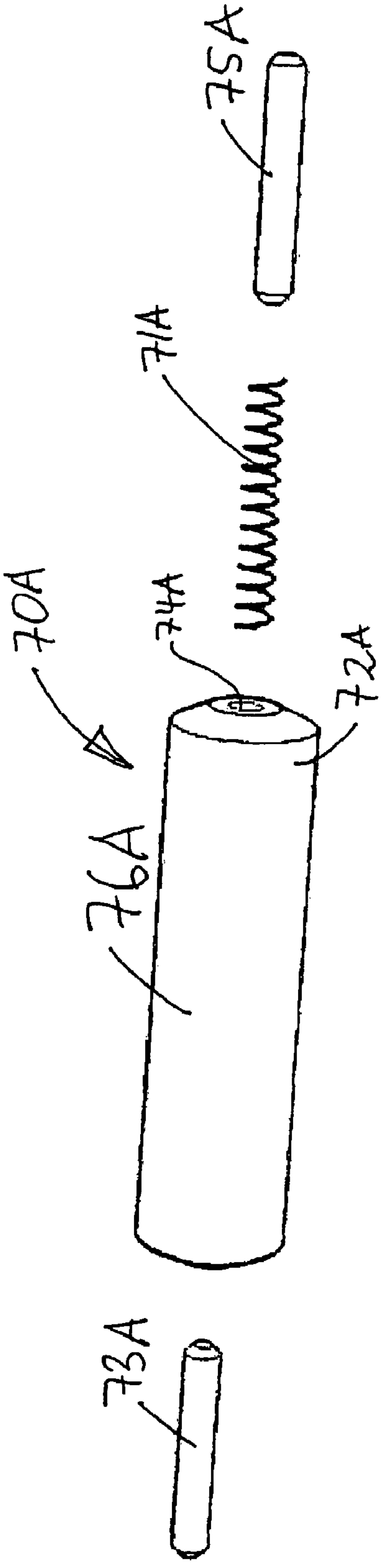
FIG. 10 is an exploded perspective view of a wheel of the present invention and its operating parts including a spring and two oppositely disposed chamfered pins.

A rollable wheel is removably affixed with a pair of oppositely disposed interior chambers. A removable wheel 70A is illustrated in FIG. 10. The removable wheel comprises an interior steel body 72A having an interior bore 74A which extends through the length of the body and an exterior rough traction surface 76A on which the wheel rolls. The rough traction surface 76A can be made of polyurethane or rubber. A spring 71A is centrally retained within the interior bore 74A with a first pin 73A extending through one end of the interior bore and a second pin 75A extending through the opposite end the interior bore so that the spring 71A is sandwiched between the two pins. Preferably, at least the end of each pin facing out of the bore is chamfered or beveled. A wheel is inserted into a pair of oppositely disposed aligned interior chambers within two parallel transverse arms by pressing the pins 73A and 75A together to overcome the force of spring 71A and inserting the wheel assembly 70A into oppositely disposed interior chambers 60A and 60B by pushing the pins through the respective slotted openings and into the pin receiving chambers. The wheel 70A spins on the pins 73A and 75A and the pins spin within an interior chamber such as 60A or 60B. Thereafter, with the force on the pins removed, the spring force causes the pins to be retained within the pair of oppositely disposed pin receiving chambers of interior chambers 60A and 60B. Similarly, wheel 70B is retained within interior chambers 60C ands 60D. Wheels 70C and 70D are similarly retained within second housing 20A. Wheel 70A is parallel to and aligned with wheel 70C, wheel 70B is parallel to and aligned with wheel 70D and all four wheels are in the same horizontal plane. A wheel can be removed by inserting a tool such as a utility knife through a slotted opening and pressed against a chamfered end of a pin to overcome the spring force and cause the pin to be removed from the pin receiving chamber and thereby remove the wheel from the housing. Therefore, a key innovation of this invention is that the wheels are removable so that if one wheel is broken or is badly worn, it can be easily replaced.

In the preferred embodiment, the wheels are made of rubber or other material which can achieve a traction and protection on a smooth surface. In one embodiment, each wheel can be approximately one-half (½) inch in diameter and therefore extends by approximately one-eighth (⅛) inch below the lower surface 29 of the housing members 20 and 20A. The range of wheel diameters can range between three-eights (⅜) inch to three-quarters (¾) of an inch. The wheel are preferably made of rubber but can also be made of other materials such as polyurethane. The key feature of the wheel is that they must be made of materials which have good lateral traction on a smooth surface such as a piece of plywood or a 2×4. One problem discussed in the prior art is that a smooth plate affixed to the rotary power saw can slip sideways and cause binding of the rotary saw which result in kickback. The traction of the present invention wheels significantly reduces any lateral movement of the rotary power saw as it cuts through a workpiece and thereby significantly reduces the possibility of kickback. In addition, by having the interior chambers 60A through 60D extend from the bottom of the transverse arms 32, 34 and 36 (as opposed tot he top of the transverse arms) the strength of the attachment of the wheels is increased since the weight of the saw pushes down on the assembly to help retain the wheels within the assembly as the saw is moved.

Referring to FIGS. 1 and 2, first housing member 20 and second housing member 20A are retained together by three connecting rods 80, 82 and 84. Connecting rod 80 has a pair of interior chuck receiving openings 80A and 80B at opposite ends of the rod which respectively extend to an interior threaded bore 81 which extends for the length of the rod 80 between the interior end of the interior chuck receiving openings. Similarly, connecting rod 82 has a pair of interior chuck receiving openings 82A and 82B at opposite ends of the rod which respectively extend to an interior threaded bore which extends for the length of the rod 82 between the interior end of the interior chuck receiving openings. Similarly, connecting rod 84 has a pair of interior chuck receiving openings 84A and 84B at opposite ends of the rod which respectively extend to an interior threaded bore which extends for the length of the rod 84 between the interior end of the interior chuck receiving openings. Each connecting rod is respectively connected to a housing by a threaded bolt 90 which has a shoulder bolt 92 which is received within a counterbore 50 of a housing member so that the leading end of the shoulder bolt 92 rests against transverse surface 52, the body 94 of the threaded bolt extends through the smaller diameter interior bore 54 and out the opening in chuck member 42. Chuck member 42 is inserted into a chuck receiving opening 80A in a rod such as 80 and thereafter the threads 96 on the threaded bolt are threaded into the female threads with interior threaded bore 81. Each of the three rods 80, 82 and 84 is retained in this manner with a respective bolt inserted through respective aligned openings in a housing, its chuck member and into a chuck receiving member and thereafter threaded into a threaded interior bore of a rod. This is a removable attachment which permits a head portion to be replaced or permits a broken rod to be replaced. By having three connecting rods instead of a solid plate, the weight of the rolling plate assembly 10 is significantly reduced and is more stable.

The means by which a rotary power saw is attached to the rolling plate assembly will now be described. Referring to FIGS. 1 and 2, attached to the top surface 27 of the main body 22 of first housing member 20 is a fixed upwardly extending transverse plate 100 which in turn extends into a fixed tilt attachment bracket 102 having an arcuate opening 104 therein with degree scale markers 106 on an exterior surface. A tilt bracket 108 is rotatably connected to the fixed transverse plate 100 by a rotatable rivet 100 and can move in a arcuate orientation within arcuate opening 104 by a rotatable clamp 112 which oriented the degree of the tilt bracket relative to the rolling plate assembly 10. The tilt bracket has a pair of aligned arms 114 and 120 having respective parallel aligned openings 116 and 120. As will be discussed below, one portion of the rotary power saw is attached between the arms and secured by a bolt extending through the opening 116 and 120 and through an aligned channel in the rotary power saw.

Referring to FIGS. 1 and 2, the top surface 27A of the main body portion 22A of second housing member 20A has a fixed transverse bracket 130 extending upward. An elevation assembly 140 is comprised of an elevation bracket 142 have an arcuate opening 144 extending therethrough. The elevation bracket 142 is formed in one piece with a connecting arm 146 which extends from a lower end of the elevation bracket 142. An interconnecting elevation attachment bracket 148 is rotatably connected to the connecting arm 146 at a location remote from the elevation bracket 142 by a rotatable rivet 150 and is also rotatably attached to the fixed transverse bracket 130 by a rotatable rivet 152. As a result, the elevation bracket 142 can be rotated in an up and down vertical orientation relative to the rolling plate assembly 10 as shown by the arrow "A" and also can be rotated side to side relative to the rolling plate assembly 10 as shown by the arrow "B". The rotary power saw is attached to the arcuate opening by a wing but extending through one side of the elevation bracket 142, through a receiving opening in the rotary power saw, and then affixed with a nut on the opposite side of the elevation bracket 142.

Figure 11:
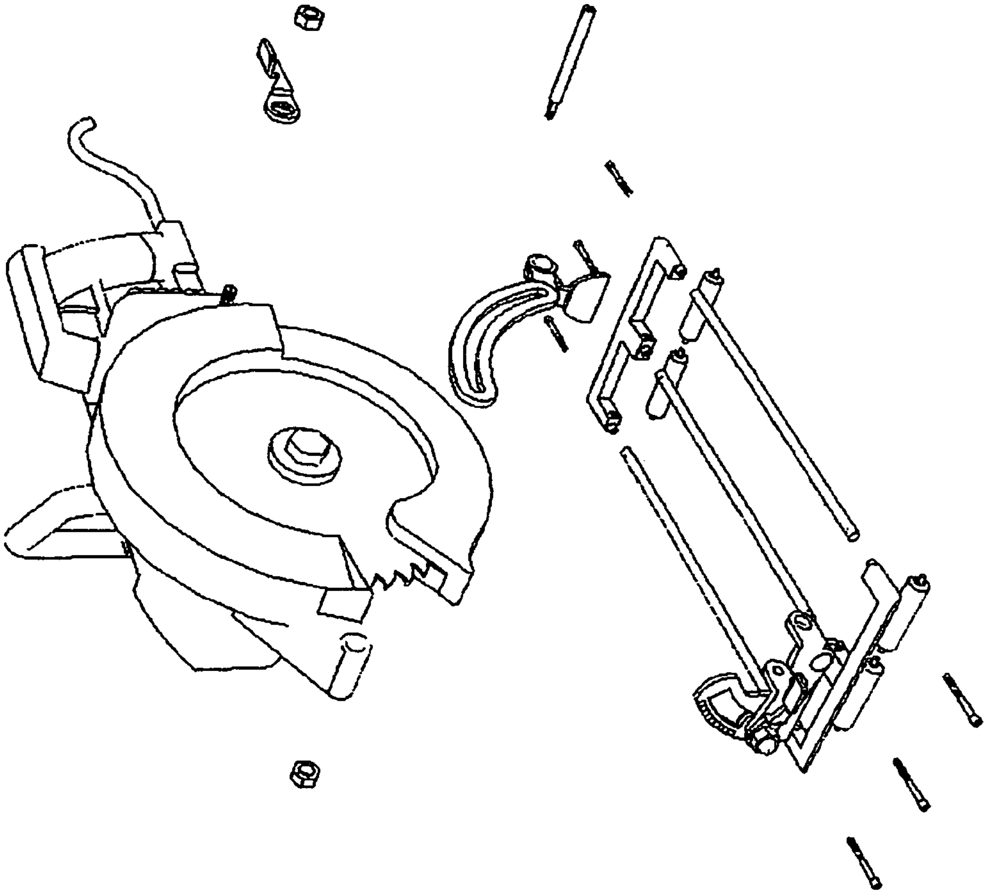
FIG. 11 is an exploded view of the present invention rolling plate assembly and also illustrating a rotary power saw elevated above the assembly before it is attached thereof.
Figure 12:
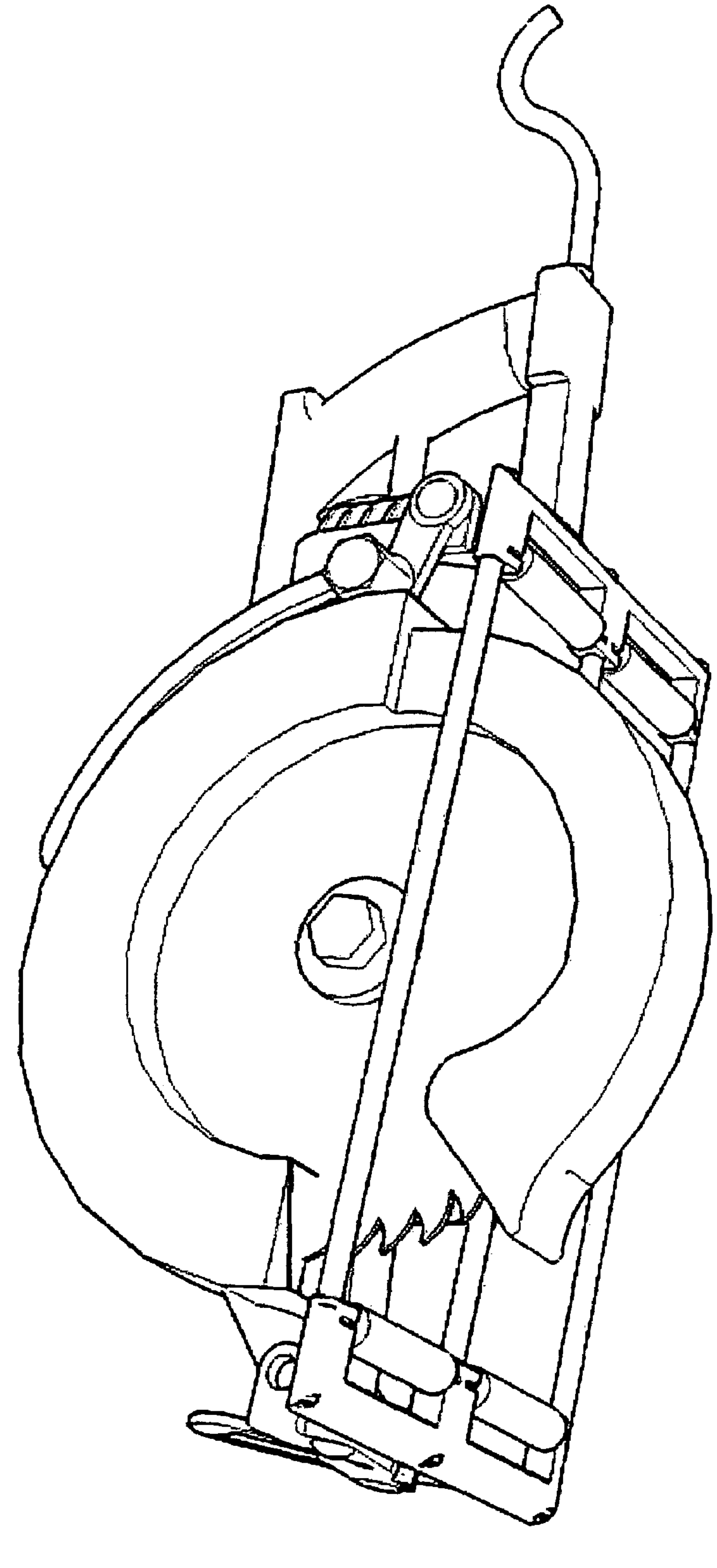
FIG. 12 is a bottom perspective view of the present invention rolling plate assembly with a rotary power saw attached thereto.

FIG. 11 is an exploded view showing a rotary power saw above a disassembled rolling plate assembly. FIG. 12 is a bottom perspective view showing the rotary power saw attached to the rolling plate assembly. In general use when used by a right handed person, the saw blade and protective shield extend through the opening between rods 80 and 82. However, for a left handed person, the present invention easily accommodates having the saw blade and protective shield extend through connecting rods 82 and 84.

The front and rear housing assembly receives the cutting blade in between its pins or axles, so that the entire width of the saw plate is supported by the wheels during cutting.

While the preferred embodiment is to have a rolling plate assembly 10 which can be disassembled, it is also within the spirit and scope of the present invention to have a one piece frame for the roller plate assembly wherein the housing members are permanently connected on two or three rods.

Through the present invention, the rolling wheel assembly is one completed unit and is easily and quickly attached to the front and back of a rotary power saw. Its rectangular design provides stability to the power saw as it cuts through a workpiece. The rolling plate assembly 10 protects the work surface by elevating the assembly above the work surface by a portion of the diameter of the wheels so that the rotary power saw can easily roll on the work surface and will not scratch the work surface. This is especially important when the work surface is made of a fine finished surface such as veneer finished woods, marble, granite, etc. In addition to reducing kickback, the strong traction of the wheels helps to absorb the vibration generated by the rotary power saw and enables the user to make easy straight cuts.

Defined in detail, the present invention is an attachment assembly for attachment to a portable rotary power saw, comprising: (a) a first housing member having a main body with a front edge and a rear edge, a top surface and a bottom surface, the front edge having an upwardly extending arcuate shape from the bottom surface to the top surface, three spaced apart parallel arms which are a first arm, a middle arm and a third arm each extending away from the rear edge with the distal end of each arm having a chuck member extending therefrom, three spaced apart interior counterbores aligned with each respective arm and extending from the front edge of the main body into an interior portion of the main body and terminating in an interior wall and an interior bore extending from the interior wall trough the main body, the aligned arm and its chuck member, each arm having an interior opening extending from its lower surface into the arm and terminating in a pin receiving chamber, the pin receiving chamber of the first arm facing the middle arm, the pin receiving chamber of the third arm facing the middle arm, and the middle arm having two aligned pin receiving chambers, one facing the first arm and one facing the third arm, the pin receiving chamber of the first arm aligned with a pin receiving chamber of the middle arm and the pin receiving chamber of the third arm aligned with a pin receiving chamber of the middle arm; (b) a second housing member which is a mirror image of the first housing member and having the same components therein, the second housing member aligned parallel to and spaced apart from the first housing member so that each of the three respective arms and their chuck members are respectively aligned; (c) four rollable wheel assemblies, each wheel assembly comprised of a wheel body with an exterior rough tractioned surface and a central bore housing an interior spring and a pin on either side of the spring, each pin extending out of the interior bore and having a chamfered end, each respective wheel assembly inserted into a pair of aligned pin receiving chambers so that the spring force causes the pins to be retained within a pin receiving chamber so that each wheel spins on a pair of pins and the pins spin inside a pin receiving chamber, two wheels aligned within each housing member and a given wheel in the first housing member parallel to and aligned with an opposite wheel in the second housing member; (d) three spaced apart parallel rods, each rod having an interior opening with an interior chuck receiving opening at each end and an interior threaded bore extending between the chuck receiving openings, each rod respectively aligned with the pair of oppositely disposed arms of the two housing members so that a respective chuck member of a housing is received within a chuck receiving member of a rod; (e) six threaded bolts, each threaded bolt having a shoulder bolt extending through a respective counterbore opening in a housing member, extending through the interior bore and chuck member and into the interior of a rod where it is threaded into the interior bore of the rod, the three rods respectively retained to interconnect the two housing members; (f) the upper surface of the main body of the first housing member having a fixed upwardly extending transverse plate which in turn extends into a fixed tilt attachment bracket having an arcuate opening therein with degree scale markers on the surface, a tilt bracket rotatably connected to the fixed transverse plate and movable within an arcuate orientation with the tilt attachment bracket, the tilt bracket having a pair of aligned arms with aligned openings to receive a bolt by which the tilt bracket is attached to a portion of the rotary power saw; and (g) the upper surface of the main body of the second housing member has a fixed transverse bracket and an elevation assembly comprised of an elevation bracket having an arcuate opening extending therethrough, the elevation bracket formed in one piece with a connecting arm, an interconnection elevation attachment bracket rotatably connected to the connecting arm and also rotatably attached to the transverse bracket, a second portion of the rotary power saw attached to the elevation bracket by a wing nut extending through the opening in the elevation bracket.

Defined broadly, the present invention is an attachment assembly for attachment to a portable rotary power saw, comprising: (a) a first housing member having a main body with a front edge and a rear edge, a top surface and a bottom surface, three spaced apart parallel arms which are a first arm, a middle arm and a third arm each extending away from the rear edge with the distal end of each arm having a chuck member extending therefrom, three spaced apart interior counterbores aligned with each respective arm and extending from the front edge of the main body into an interior portion of the main body and terminating in an interior wall and an interior bore extending from the interior wall trough the main body, the aligned arm and its chuck member, each arm having an interior opening extending from its lower surface into the arm and terminating in a pin receiving chamber, the pin receiving chamber of the first arm facing the middle arm, the pin receiving chamber of the third arm facing the middle arm, and the middle arm having two aligned pin receiving chambers, one facing the first arm and one facing the third arm, the pin receiving chamber of the first arm aligned with a pin receiving chamber of the middle arm and the pin receiving chamber of the third arm aligned with a pin receiving chamber of the middle arm; (b) a second housing member which is a mirror image of the first housing member and having the same components therein, the second housing member aligned parallel to and spaced apart from the first housing member so that each of the three respective arms and their chuck members are respectively aligned; (c) four rollable wheel assemblies, each wheel assembly comprised of a wheel body with an exterior rough tractioned surface and a central bore housing an interior spring and a pin on either side of the spring, each pin extending out of the interior bore and having a chamfered end, each respective wheel assembly inserted into a pair of aligned pin receiving chambers so that the spring force causes the pins to be retained within a pin receiving chamber so that each wheel spins on a pair of pins and the pins spin inside a pin receiving chamber, two wheels aligned with each housing member and a given wheel in the first housing member parallel to and aligned with an opposite wheel in the second housing member; (d) three spaced apart parallel rods, each rod having an interior opening with an interior chuck receiving opening at each end and an interior threaded bore extending between the chuck receiving openings, each rod respectively aligned with the pair of oppositely disposed arms of the two housing members so that a respective chuck member of a housing is received within a chuck receiving member of a rod; (e) six threaded bolts, each threaded bolt having a shoulder bolt extending through a respective counterbore opening in a housing member, extending through the interior bore and chuck member and into the interior of a rod where it is threaded into the interior bore of the rod, the three rods respectively retained to interconnect the two housing members; (f) the upper surface of the main body of the first housing member having means to rotatably retain a portion of the rotary power saw; and (g) the upper surface of the main body of the second housing member having means to rotatably retain a portion of the rotary power saw.

Defined more broadly, the present invention is an attachment assembly for attachment to a portable rotary power saw, comprising: (a) a first housing member having a main body with a front edge and a rear edge, a top surface and a bottom surface, three spaced apart parallel arms which are a first arm, a middle arm and a third arm each extending away from the rear edge, three spaced apart interior bores aligned with each respective arm and extending from the front edge of the main body though an aligned arm, each arm having an interior receiving chamber, the receiving chamber of the first arm facing the middle arm, the receiving chamber of the third arm facing the middle arm, and the middle arm having two aligned receiving chambers, one facing the first arm and one facing the third arm, the receiving chamber of the first arm aligned with a receiving chamber of the middle arm and the receiving chamber of the third arm aligned with a receiving chamber of the middle arm; (b) a second housing member which is a mirror image of the first housing member and having the same components therein, the second housing member aligned parallel to and spaced apart from the first housing member so that each of the three respective arms are respectively aligned; (c) four rollable wheel assemblies, each wheel assembly comprised of a wheel body with an exterior rough tractioned surface and a central bore housing biasing means and a wheel retaining means on either side of the biasing means, each respective wheel assembly inserted into a pair of aligned receiving chambers so that the biasing means causes the wheel retaining means to be retained within a receiving chamber, two wheels aligned within each housing member and a given wheel in the first housing member parallel to and aligned with an opposite wheel in the second housing member so that the wheel spins on the pins and the pins spin inside the receiving chambers; (d) three spaced apart parallel rods, each rod having an interior opening with an interior threaded bore, each rod respectively aligned with a pair of oppositely disposed arms of the two housing members; (e) at least six threaded bolts respectively extending through a respective interior bore in a housing member and into the interior of a rod where it is threaded into the interior bore of the rod, the at least two rods respectively retained to interconnect the two housing members; (f) the upper surface of the main body of the first housing member having means to rotatably retain a portion of the rotary power saw; and (g) the upper surface of the main body of the second housing member having means to rotatably retain a portion of the rotary power saw.

Defined even more broadly, the present invention is an attachment assembly for attachment to a portable rotary power saw, comprising: (a) a first housing member having a main body with a front edge and a rear edge, a top surface and a bottom surface, three spaced apart parallel arms which are a first arm, a middle arm and a third arm each extending away from the rear edge, each arm having an interior receiving means, the receiving means of the first arm facing the middle arm, the receiving means of the third arm facing the middle arm, and the middle arm having two aligned receiving means, one facing the first arm and one facing the third arm, the receiving means of the first arm aligned with a receiving means of the middle arm and the receiving means of the third arm aligned with a receiving means of the middle arm; (b) a second housing member which is a mirror image of the first housing member and having the same components therein, the second housing member aligned parallel to and spaced apart from the first housing member so that each of the three respective arms are respectively aligned; (c) four rollable wheel assemblies, each wheel assembly comprised of a wheel body with an exterior rough tractioned surface and a central bore housing biasing means and a wheel retaining means on either side of the biasing means, each respective wheel assembly inserted into a pair of aligned receiving means so that the biasing means causes the wheel retaining means to be retained within a receiving means in an arm, two wheels aligned within each housing member and a given wheel in the first housing member parallel to and aligned with an opposite wheel in the second housing member; (d) three spaced apart parallel rods interconnecting the two housing members, with a respective rod interconnecting two aligned pairs of arms so that a gap is formed between each of two adjacent rods; (e) the upper surface of the main body of the first housing member having means to rotatably retain a portion of the rotary power saw; and (f) the upper surface of the main body of the second housing member having means to rotatably retain a portion of the rotary power saw.

Defined even more broadly, the present invention is an attachment assembly for attachment to a portable rotary power saw, comprising: (a) a first housing member having a main body with a front edge and a rear edge, a top surface and a bottom surface, at least two spaced apart parallel arms extending away from the rear edge, an interior bore extending through the main body from the front edge through the attached arm, each arm having an interior receiving chamber, the receiving chamber of the at lest two arms facing each other; (b) a second housing member which is a mirror image of the first housing member and having the same components therein, the second housing member aligned parallel to and spaced apart from the first housing member so that each of the respective arms are respectively aligned; (c) at least two rollable wheel assemblies, each wheel assembly comprised of a wheel body with an exterior rough tractioned surface and a central bore housing an interior biasing means and a wheel retaining means on either side of the biasing means, each respective wheel assembly inserted into a pair of aligned receiving chambers so that the biasing means causes the wheel retaining means to be retained within a receiving chamber so that the wheel spins on the wheel retaining means and the wheel retaining means spins within a receiving chamber, a given wheel in the first housing member parallel to and aligned with an opposite wheel in the second housing member; (d) at least two spaced apart parallel rods, each rod having an interior opening with an interior threaded bore, each rod respectively aligned with the pair of oppositely disposed arms of the two housing members; (e) at least four threaded bolts respectively extending through a respective interior bore in a housing member and into the interior of a rod where it is threaded into the interior bore of the rod, the at least two rods respectively retained to interconnect the two housing members; (f) the upper surface of the main body of the first housing member having means to rotatably retain a portion of the rotary power saw; and (g) the upper surface of the main body of the second housing member having means to rotatably retain a portion of the rotary power saw.

Defined even more broadly, the present invention is an attachment assembly for attachment to a portable rotary power saw, comprising: (a) a first housing member having a main body with a front edge and a rear edge, a top surface and a bottom surface, at least two spaced apart parallel arms extending away from the rear edge, each arm having an interior opening terminating in a receiving chamber, the receiving chamber of the at least two arms facing each other; (b) a second housing member which is a mirror image of the first housing member and having the same components therein, the second housing member aligned parallel to and spaced apart from the first housing member so that each of the respective arms are respectively aligned; (c) at least two rollable wheel assemblies, each wheel assembly comprised of a wheel body with an exterior rough tractioned surface and a central bore housing an interior biasing means and a wheel retaining means on either side of the biasing means, each respective wheel assembly inserted into a pair of aligned receiving chambers so that the biasing means causes the wheel retaining means to be retained within a receiving chamber so that the wheel spins on the wheel retaining means and the wheel retaining means spins within a receiving chamber, a given wheel in the first housing member parallel to and aligned with an opposite wheel in the second housing member; (d) at least two spaced apart parallel rods respectively aligned with the pair of oppositely disposed arms of the two housing members and interconnecting the two housing members; (e) the upper surface of the main body of the first housing member having means to rotatably retain a portion of the rotary power saw; and (f) the upper surface of the main body of the second housing member having means to rotatably retain a portion of the rotary power saw.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which the invention might be embodied or operated.

What is claimed is:

1. An attachment assembly for attachment to a portable rotary power saw, comprising:

a. a first housing member having a main body with a front edge and a rear edge, a top surface and a bottom surface, the front edge having an upwardly extending arcuate shape from the bottom surface to the top surface, three spaced apart parallel arms which are a first arm, a middle arm and a third arm each extending away from the rear edge with the distal end of each arm having a chuck member extending therefrom, three spaced apart interior counterbores aligned with each respective arm and extending from the front edge of the main body into an interior portion of the main body and terminating in an interior wall and an interior bore extending from the interior wall trough the main body, the aligned arm and its chuck member, each arm having an interior opening extending from its lower surface into the arm and terminating in a pin receiving chamber, the pin receiving chamber of the first arm facing the middle arm, the pin receiving chamber of the third arm facing the middle arm, and the middle arm having two aligned pin receiving chambers, one facing the first arm and one facing the third arm, the pin receiving chamber of the first arm aligned with a pin receiving chamber of the middle arm and the pin receiving chamber of the third arm aligned with a pin receiving chamber of the middle arm;

b. a second housing member which is a mirror image of the first housing member and having the same components therein, the second housing member aligned parallel to and spaced apart from the first housing member so that each of the three respective arms and their chuck members are respectively aligned;

c. four rollable wheel assemblies, each wheel assembly comprised of a wheel body with an exterior rough tractioned surface and a central bore housing an interior spring and a pin on either side of the spring, each pin extending out of the interior bore and having a chamfered end, each respective wheel assembly inserted into a pair of aligned pin receiving chambers so that the spring force causes the pins to be retained within a pin receiving chamber so that each wheel spins on a pair of pins and the pins spin inside a pin receiving chamber, two wheels aligned within each housing member and a given wheel in the first housing member parallel to and aligned with an opposite wheel in the second housing member;

d. three spaced apart parallel rods, each rod having an interior opening with an interior chuck receiving opening at each end and an interior threaded bore extending between the chuck receiving openings, each rod respectively aligned with the pair of oppositely disposed arms of the two housing members so that a respective chuck member of a housing is received within a chuck receiving member of a rod;

e. six threaded bolts, each threaded bolt having a shoulder bolt extending through a respective counterbore opening in a housing member, extending through the interior bore and chuck member and into the interior of a rod where it is threaded into the interior bore of the rod, the three rods respectively retained to interconnect the two housing members;

f. the upper surface of the main body of the first housing member having a fixed upwardly extending transverse plate which in turn extends into a fixed tilt attachment bracket having an arcuate opening therein with degree scale markers on the surface, a tilt bracket rotatably connected to the fixed transverse plate and movable within an arcuate orientation with the tilt attachment bracket, the tilt bracket having a pair of aligned arms with aligned openings to receive a bolt by which the tilt bracket is attached to a portion of the rotary power saw; and g. the upper surface of the main body of the second housing member has a fixed transverse bracket and an elevation assembly comprised of an elevation bracket having an arcuate opening extending therethrough, the elevation bracket formed in one piece with a connecting arm, an interconnection elevation attachment bracket rotatably connected to the connecting arm and also rotatably attached to the transverse bracket, a second portion of the rotary power saw attached to the elevation bracket by a wing nut extending through the opening in the elevation bracket.

2. An attachment assembly in accordance with claim 1 wherein each wheel is removably attached to its respective housing member.

3. An attachment assembly in accordance with claim 1 wherein each wheel is made from the group selected from polyurethane and rubber.

4. An attachment assembly in accordance with claim 1 wherein each rod is removably connected to a housing member.

5. An attachment assembly in accordance with claim 1 wherein the saw blade can extend through an opening between the first rod and the middle rod or can extend through an opening between thee third rod and the middle rod.

6. An attachment assembly for attachment to a portable rotary power saw, comprising:

a. a first housing member having a main body with a front edge and a rear edge, a top surface and a bottom surface, three spaced apart parallel arms which are a first arm, a middle arm and a third arm each extending away from the rear edge with the distal end of each arm having a chuck member extending therefrom, three spaced apart interior counterbores aligned with each respective arm and extending from the front edge of the main body into an interior portion of the main body and terminating in an interior wall and an interior bore extending from the interior wall trough the main body, the aligned arm and its chuck member, each arm having an interior opening extending from its lower surface into the arm and terminating in a pin receiving chamber, the pin receiving chamber of the first arm facing the middle arm, the pin receiving chamber of the third arm facing the middle arm, and the middle arm having two aligned pin receiving chambers, one facing the first arm and one facing the third arm, the pin receiving chamber of the first arm aligned with a pin receiving chamber of the middle arm and the pin receiving chamber of the third arm aligned with a pin receiving chamber of the middle arm;

b. a second housing member which is a mirror image of the first housing member and having the same components therein, the second housing member aligned parallel to and spaced apart from the first housing member so that each of the three respective arms and their chuck members are respectively aligned;

c. four rollable wheel assemblies, each wheel assembly comprised of a wheel body with an exterior rough tractioned surface and a central bore housing an interior spring and a pin on either side of the spring, each pin extending out of the interior bore and having a chamfered end, each respective wheel assembly inserted into a pair of aligned pin receiving chambers so that the spring force causes the pins to be retained within a pin receiving chamber so that each wheel spins on a pair of pins and the pins spin inside a pin receiving chamber, two wheels aligned within each housing member and a given wheel in the first housing member parallel to and aligned with an opposite wheel in the second housing member;

d. three spaced apart parallel rods, each rod having an interior opening with an interior chuck receiving opening at each end and an interior threaded bore extending between the chuck receiving openings, each rod respectively aligned with the pair of oppositely disposed arms of the two housing members so that a respective chuck member of a housing is received within a chuck receiving member of a rod;

e. six threaded bolts, each threaded bolt having a shoulder bolt extending through a respective counterbore opening in a housing member, extending through the interior bore and chuck member and into the interior of a rod where it is threaded into the interior bore of the rod, the three rods respectively retained to interconnect the two housing members;

f. the upper surface of the main body of the first housing member having means to rotatably retain a portion of the rotary power saw; and g. the upper surface of the main body of the second housing member having means to rotatably retain a portion of the rotary power saw.

7. An attachment assembly in accordance with claim 6 wherein each wheel is removably attached to its respective housing member.

8. An attachment assembly in accordance with claim 6 wherein each wheel surface is made from the group selected from polyurethane and rubber.

9. An attachment assembly in accordance with claim 6 wherein each rod is removably connected to a housing member.

10. An attachment assembly in accordance with claim 6 wherein the saw blade can extend through an opening between the first rod and the middle rod or can extend through an opening between thee third rod and the middle rod.

* * * * *